United States Patent [19]

Duvlis

[11] 4,063,495

[45] Dec. 20, 1977

[54] CONTAMINATION PREVENTION FOR OPERATING AREAS

[76] Inventor: Zinon Duvlis, Burgdorfer Damm 5, 3 Hannover, Germany

[21] Appl. No.: 667,012

[22] Filed: Jan. 21, 1976

Related U.S. Application Data

[63] Continuation-in-part of Ser. No. 570,189, April 21, 1975.

[30] Foreign Application Priority Data

Jan. 25, 1975 Germany ............................ 2503056

[51] Int. Cl.[2] ......................... F24F 9/00; B01D 46/00

[52] U.S. Cl. .................................. 98/36; 98/115 LH; 128/1 R; 55/DIG. 29

[58] Field of Search .................. 98/36, 33 R, 115 LH; 128/1 R, 132 R; 55/DIG. 29, 473

[56] References Cited

U.S. PATENT DOCUMENTS

| | | | |
|---|---|---|---|
| 3,279,883 | 10/1966 | Thompson et al. | 98/36 X |
| 3,380,369 | 4/1968 | Allander | 98/36 |
| 3,721,067 | 3/1973 | Agnew | 98/36 X |
| 3,893,457 | 7/1975 | Van Der Waaij | 98/36 X |

FOREIGN PATENT DOCUMENTS

| | | | |
|---|---|---|---|
| 481,991 | 3/1938 | United Kingdom | 98/36 |

*Primary Examiner*—John J. Camby
*Assistant Examiner*—Henry C. Yuen
*Attorney, Agent, or Firm*—Michael J. Striker

[57] ABSTRACT

An arrangement for preventing access of bacteria and other contaminants to an area in which medical operations are carried out, having first instrumentalities for producing a stream of sterile gas, second instrumentalities for directing the stream tangentially over the area to form a gas curtain which prevents access of contaminants to the area, and third instrumentalities for preventing ambient contaminants from penetrating into the stream of sterile gas.

8 Claims, 7 Drawing Figures

1
2
3
4
5
6
7
7
8
12
12
13
14
14
15
15
16
17
19
20
21
22

CONTAMINATION PREVENTION FOR OPERATING AREAS

CROSS-REFERENCE TO RELATED APPLICATION

This is a continuation-in-part of my copending application Ser. No. 570,189, filed Apr. 21, 1975.

BACKGROUND OF THE INVENTION

This invention relates to the prevention of access of bacteria and other contaminants to an area where medical operations are carried out.

In my copending application I have disclosed that bacteria and other contaminants can be denied access to such an area by directing a stream of sterile gas over the area to act as gas curtain which prevents access of such contaminants to the area.

That arrangement has been found to be largely satisfactory in its intended effect. However, I have observed that there are some ways in which contaminants may still penetrate the gas curtain.

In particular, in the area where the stream of sterile gas issues from the outlet opening that is provided to direct it across the operating area, there is the danger that the sterile gas stream aspirates contaminants from the ambient space into its boundary layer from where they can make their way to the protected operating area. Contaminants may also enter from the area below the top of the operating table, making their way around the edge of the operating table top and then being picked up by gas eddies to be carried to the operating area.

SUMMARY OF THE INVENTION

Accordingly, it is an object of the invention to overcome these problems.

More particularly, it is an object of the invention to protect the operating area still more reliably against contaminants.

A particular object of the invention is to protect the stream of sterile gas against penetrations by such contaminants.

Further objects are to provide a novel method and arrangement for so protecting the stream of sterile gas.

In keeping with these objects, and with others which will become apparent hereafter, one feature of the invention resides in a novel arrangement of the type in question which, briefly stated, comprises first means for producing a stream of sterile gas, second means for directing the stream tangentially over the area to form a gas curtain which prevents access of contaminants to the area, and third means for preventing ambient contaminants from penetrating into the stream of sterile gas.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
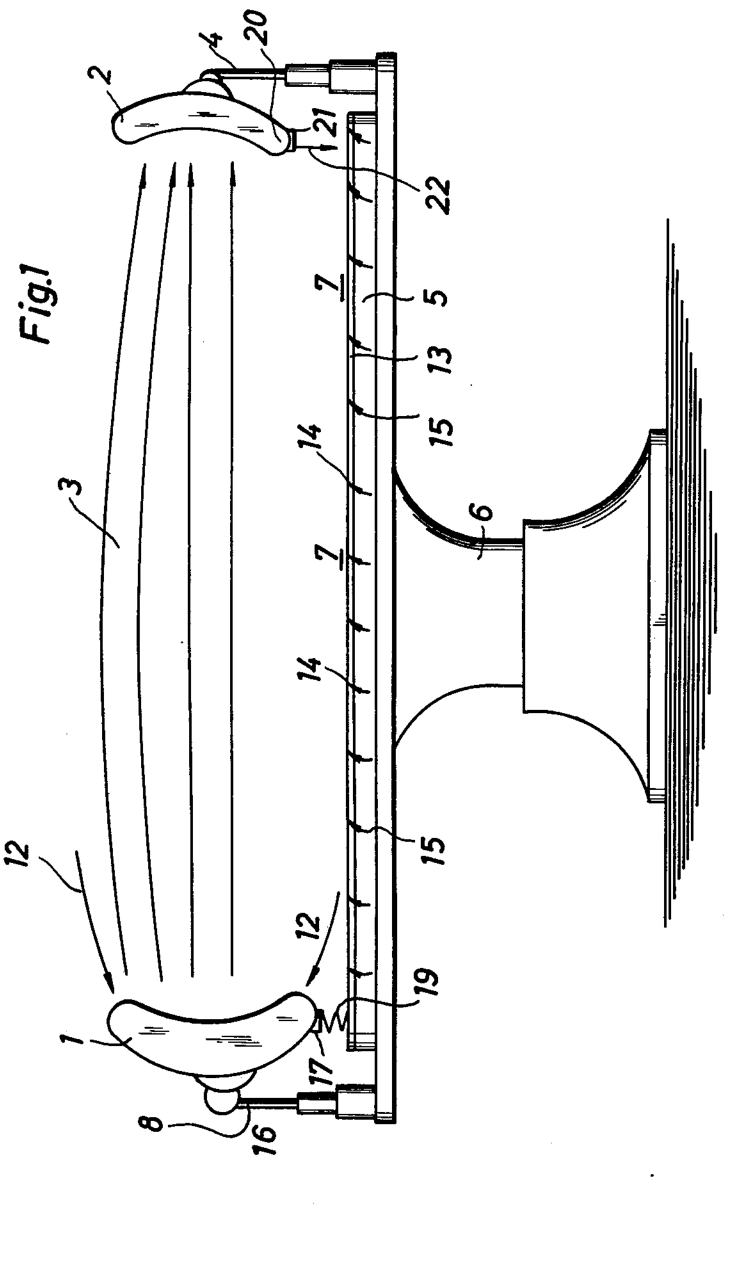
FIG. 1 is a diagrammatic illustration, showing an operating table and an arrangement according to the present invention.
Figure 2:
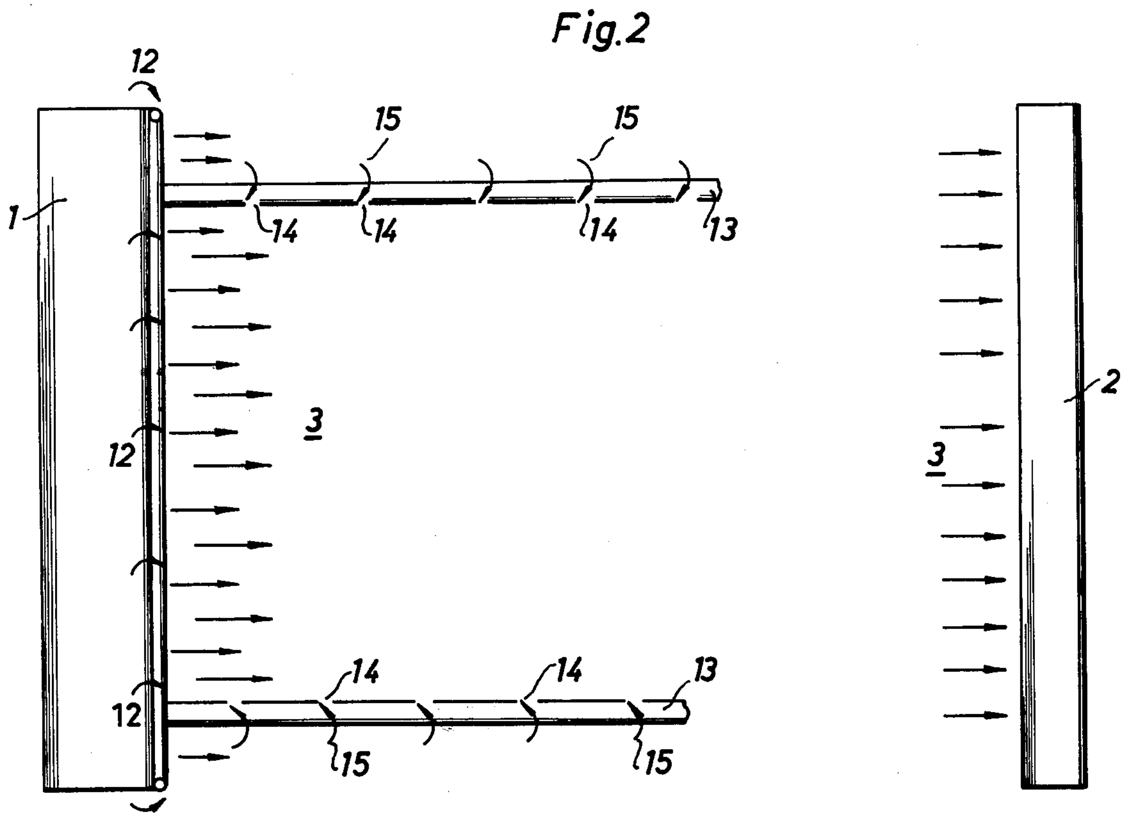
FIG. 2 is a top plan view of parts of the novel arrangement.

The invention is illustrated in FIGS. 1–7 by way of exemplary embodiments. The novel arrangement will be seen in FIGS. 1–3 to have a discharge element or head 1 and an aspirating or suction head 2. A stream 3 of sterile gas, e.g. air, is discharged from head 1 in direction towards the head 2 which aspirates it for withdrawal via conduits 4.

The arrangement is for use with an operating table 6 on the top 5 of which medical operations are to be carried out, so that the area 7 above the top 5 must be protected against contaminants, such as bacteria. Heads 1 and 2 may be mounted on adjustable joints (e.g. ball-joints) so that they can be adjusted relative to one another in such a manner that the protective gas stream 3 travels exactly above the area 7.

Depending upon the particular operation to be carried out, the size and shape of the area 7 to be protected may differ from case to case. To allow for such variations, the heads 1 and 2 are mounted on their supports 8 in such a manner that they can be raised and lowered. Head 1 may be concavely curved, in accordance with the contours of a patient resting on the table top 5. It could also be made flexible, so as to accommodate it to different contours.

This arrangement discharges the sterile gas stream 3 which flows above the area 7 in a tunnel-shaped or curtain-like manner and prevents access of contaminants to the area 7. The gas stream 3 may also be so directed that it flows over the edges of the operating wound, e.g. incision, in such a manner that these edges are prevented from drying out. This effect may be obtained, e.g. by having an upper part of the stream travel at higher speed than a lower part of the stream. If the stream 3 is concavely curved in cross-section, it can be used for intensive care applications where a patient must be protected against contaminants. The heads 1 and 2 are so adjusted that the stream 3 travels tangentially over the area 7.

The features set forth above, and the manner in which the sterile gas stream 3 is produced, are essentially set forth in my aforementioned copending application.

I have now found that it is important to protect the gas stream 3 itself against penetration by contaminants which could otherwise make their way through the stream 3 to the area 7.

To achieve this, I surround the outlet opening 9 for stream 3 with ports 10, preferably of slot-shaped configuration. The ports 10 could also have other shapes, e.g. be in form of laterally adjacent bores which are distributed over the boundary wall 11 of opening 9. These ports 10 extend substantially parallel to the flow-direction of stream 3 and are preferably connected with a source of constant suction.

As a result of such suction, a protective air stream 12 is generated which flows towards the ports 10, in countercurrent to the stream 3. Air stream 12, whose length depends upon the degree of suction in ports 10, extends partly along the stream 3 and tubularly surrounds the opening 9. Any bacteria or other contaminants which tend to be drawn from the ambient space into the stream 3 by the velocity of the same, are removed from the stream 3 due to the fact that the surrounding stream 12 draws off the boundary layer of stream 3 and thus carries all such contaminants into the ports 10.

Figure 4:
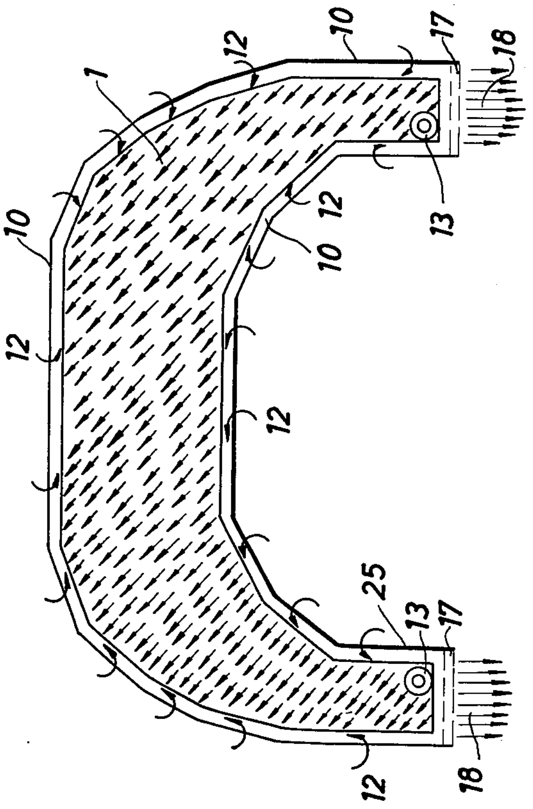
FIG. 4 is a view similar to FIG. 3, but illustrating a field of flow.
Figure 3:
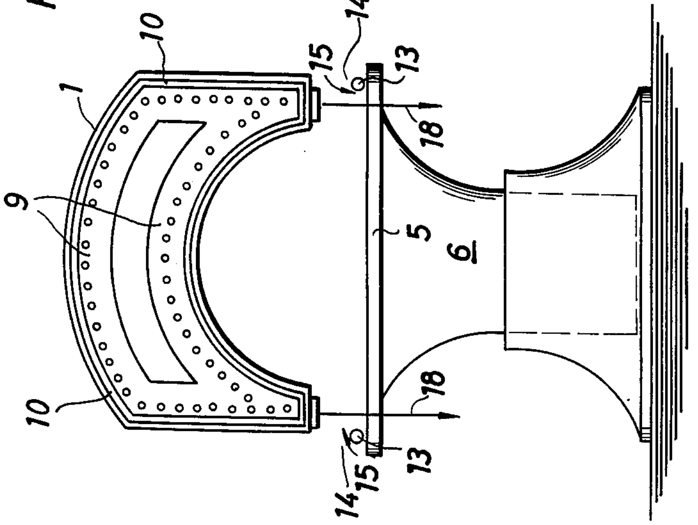
FIG. 3 shows these parts in a front view.
Figure 6:
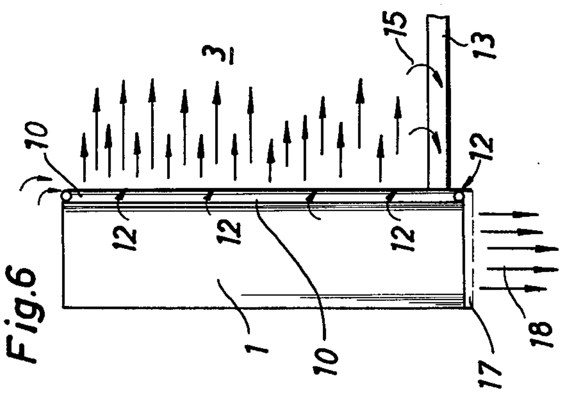
FIG. 6 is a side view of the element in FIG. 5.
Figure 5:
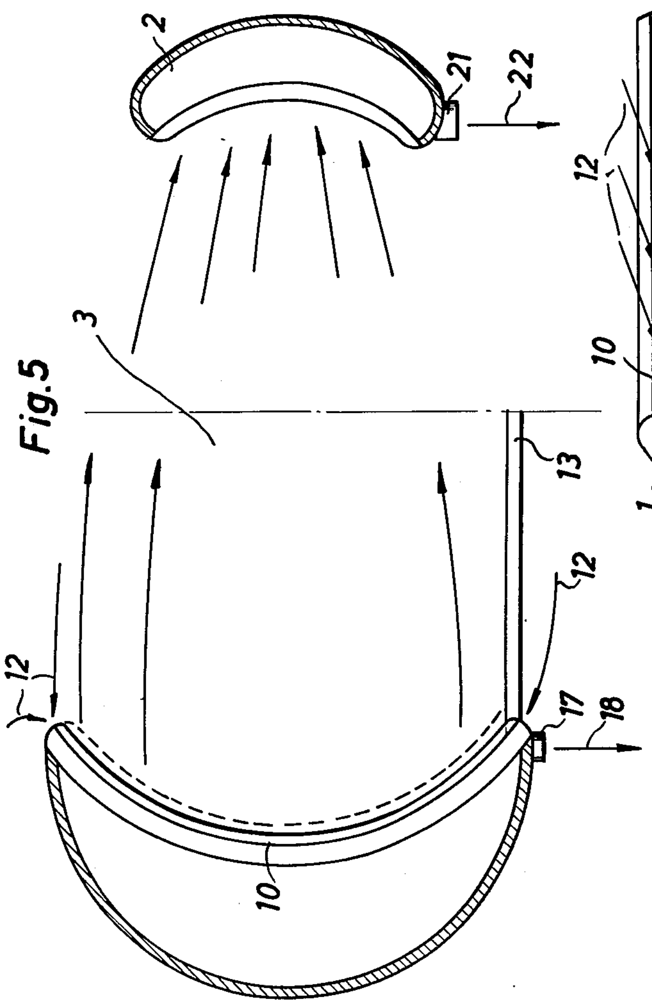
FIG. 5 is a longitudinal section through an element of the invention.
Figure 7:
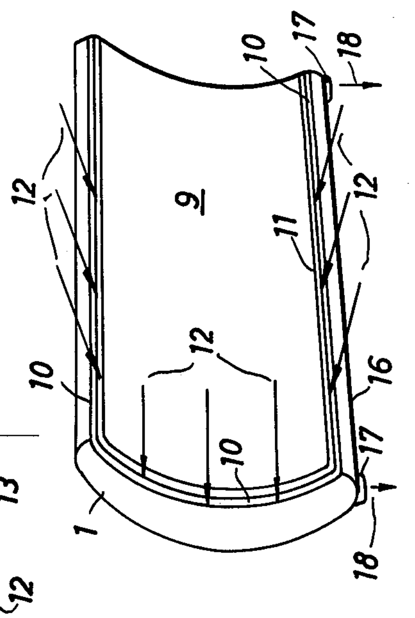
FIG. 7 is a perspective view of the element in FIG. 6.

FIG. 4 shows that the ports 10 can be combined to form a channel-shaped port which annularly surrounds the opening 9. Such a construction is best suited if there are no obstructing elements present in the opening 9. The latter may, incidentally, be of different shapes, e.g. rectangular, horse-shoe shaped or the like, and depending upon the particular requirements for area 7 the ports 10 may surround the opening 9, be located only at its lateral sides, only at its top and bottom, or be otherwise distributed.

Instead of connecting the ports 10 with a source of suction, they could also be connected with a source of pressure which is adequate to impart to the air stream 12 a flow speed greater than that of stream 3. The flow of stream 12 would then be concurrent with that of stream 3. It is, however, always important that there be relative movement between the streams 3 and 12.

The entry of contaminants from the area below and laterally of the operating table 6 must also be prevented. For this purpose, tubes 13 are arranged which extend adjacent and substantially parallel to the lateral edges of the table top 5 and preferably extend over the entire length of these lateral edges. Tubes 13 have openings 14, preferably in form of slots extending parallel to the lateral edges. The tubes 13 may, but need not be, arranged upwardly of the table top 5. They could also be recessed into the same, be located beneath the level of the top 5, or arranged laterally thereof. They may also be located outside or inside of the head 1.

Tubes 13 are connected with a source of suction, preferably a source of constant suction, so that lateral eddies formed in the stream 3 are aspirated into the slots 14. The latter could also be facing towards the area 7, if desired. This aspiration takes place in form of gas streams 15 which carry along any contaminated air from the lateral regions of stream 3 and from the lateral edges of table top 5, as well as from the area beneath the table top 5. If desired, the tubes 13 could be communicated with the passages which in head 1 connect the ports 10 with the suction source, especially if lateral portions 25 of head 1 extend to the immediate vicinity of the table top 5.

To protect gas stream 3 against contaminants that might enter it from the area below table top 5, the head 1 is provided in the region of its lower end 16, near the corners of top 5, with downwardly facing openings 17. These are preferably provided at the underside of portions 25 and connected with a source of gas under constant pressure, so that a stream 18 issues from them. This stream is directed into the area below table top 5 where it entrains any contaminants and carries them away from the top 5. Openings 17 may face vertically downwardly, or at an angle. The area between top 5 and openings 17 is provided with a baffle 19 which shields the area 7 relative to the area forwardly of head 1. However, the baffle 19 could be omitted, if the openings 17 are arranged over the entire lower end 16 of head 1 so as to produce a fan-shaped air curtain. Depending upon the size and shape of the area 7, the openings 17 could be connected with a suction source instead of a pressure source, so that a stream 18 is produced which flows into the openings 17, rather than out of them, but of course serves the same purpose.

If desired, the head 2 may also be provided at its lower end 20 with downwardly directed openings 21. These are preferably connected to a source of gas under pressure and advantageously are spaced over the entire lower end 20. They discharge a fan-shaped gas stream 22 which prevents any contaminants below table top 5 from rising upwardly along the edge of top 5 which is located adjacent head 2. Conversely, the openings 21 could, of course, be connected to a source of suction. This would cause a flow of the gas stream 22 into the openings 21, but the purpose and end effect would be the same.

Heads 1 and 2 may be mounted on table top 5 turnably and height-adjustably, by means of supports 8. However, they could be mounted on supports that are separate and spaced from the table 5, if desired. The area between table top 5 and the lower end 16 of the head 1 is protected against entry of contaminants by the baffle 19 which is preferably of flexible material, e.g. a synthetic plastic material such as PVC, PUT or the like. If the baffle 19 is omitted, then this area is shielded by the downwardly directed, fan-shaped gas stream 18.

The boundary-layer removing gas stream which protects the stream 3 against contaminants may be made up of several partial or individual streams, as described. This has the advantage of completely protecting the lateral regions of stream 3 which are particularly susceptable to the entry of contaminants. However, a single, essentially tubular protective stream may also be utilized which surrounds the stream 3 completely.

It will be understood that each of the elements described above, or two or more together, may also find a useful application in other types of applications differing from the types described above.

While the invention has been illustrated and described as embodied in an arrangement for protecting an operating area, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for preventing access of bacteria and other contaminants to an area in which medical operations are carried out, comprising first means for producing a stream of sterile gas; second means for directing said stream tangentially over said area to form a gas curtain which prevents access of contaminants to said area, said second means comprising a discharge opening for said first-mentioned stream; and third means forming an additional annular stream surrounding said first mentioned stream, said additional stream of gas traveling at differential speed relative to the first-mentioned stream and drawing off the boundary layer of the same so as to prevent ambient contaminants from penetrating into said stream of sterile gas, said third means comprising suction port means in the region of said discharge opening for drawing contaminants out of said boundary layer of said first-mentioned stream.

2. An arrangement for preventing access of bacteria and other contaminants to an area in which medical operations are carried out, comprising first means for producing a stream of sterile gas; second means for directing said stream tangentially over said area to form a gas curtain which prevents access of contaminants to said area; and third means for preventing ambient contaminants from penetrating into said stream of sterile gas; said third means comprising an additional stream of gas which travels at differential speed relative to the first-mentioned stream and draws off the boundary layer of the same, said additional stream being annular, surrounding said first-mentioned stream and traveling in counterflow to the same.

3. An arrangement for preventing access of bacteria and other contaminants to an area in which medical operations are carried out, comprising first means for producing a stream of sterial gas; second means for directing said stream tangentially over said area to form a gas curtain which prevents access of contaminants to said area, said second means comprising a discharge opening for said first-mentioned stream having an upper and a lower edge region, and third means for preventing ambient contaminants from penetrating into said stream of sterile gas, said third means comprising suction port means in the region of said discharge opening for sucking an additional stream of gas which travels at differential speed relative to the first-mentioned stream and draws off the boundary layer of the same, said suction port means comprising respective suction ports at said upper and lower edge regions of said discharge opening of said second means.

4. An arrangement as defined in claim 3, wherein said streams flow in mutually different directions.

5. An arrangement as defined in claim 3, wherein said suction ports are provided in walls bounding said edge regions.

6. An arrangement for preventing access of bacteria and other contaminants to an area in which medical operations are carried out on an operating table having longitudinally extending lateral edges, the arrangement comprising first means for producing a stream of sterial gas; second means for directing said stream tangentially over said area to form a gas curtain which prevents access of contaminants to said area; and third means for preventing ambient contaminants from penetrating into said stream of sterial gas said third means comprising at least two suction ports arranged to be located adjacent said lateral edges and facing substantially parallel thereof, each of said suction ports facing towards the first-mentioned stream and being adapted to aspirate a protective stream which sweeps along said first-mentioned stream and draws off the boundary layer of the same.

7. An arrangement as defined in claim 6, said suction ports being arranged to be located at a level below the top of said operating table and facing the underside of said top.

8. An arrangement as defined in claim 6; further comprising outlet ports arranged to discharge streams of gas which flow in direction downwardly of said top and away from the operating area.

* * * * *